May 16, 1933. J. LEDWINKA 1,909,287
AUTOMOBILE BODY
Filed Aug. 16, 1927 5 Sheets-Sheet 2

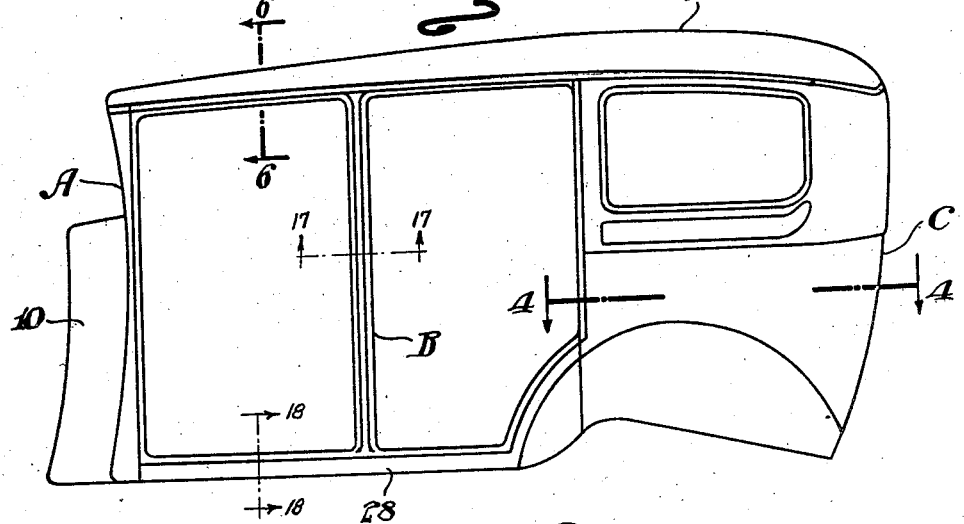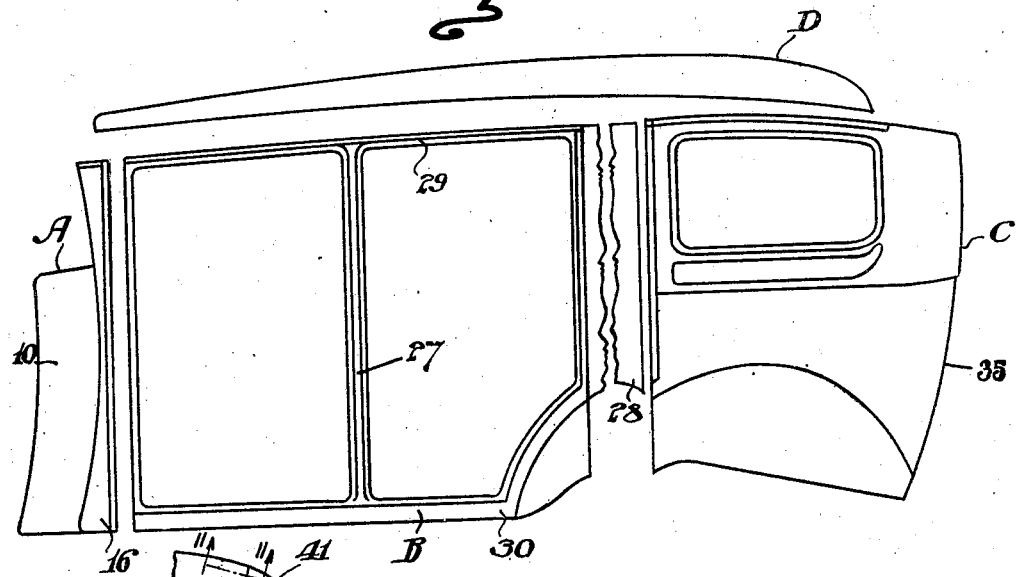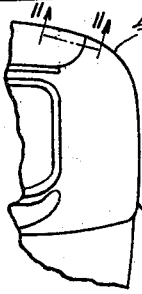

INVENTOR.
Joseph Ledwinka
BY
ATTORNEY.

May 16, 1933.                J. LEDWINKA                1,909,287
                            AUTOMOBILE BODY
                    Filed Aug. 16, 1927        5 Sheets-Sheet 3
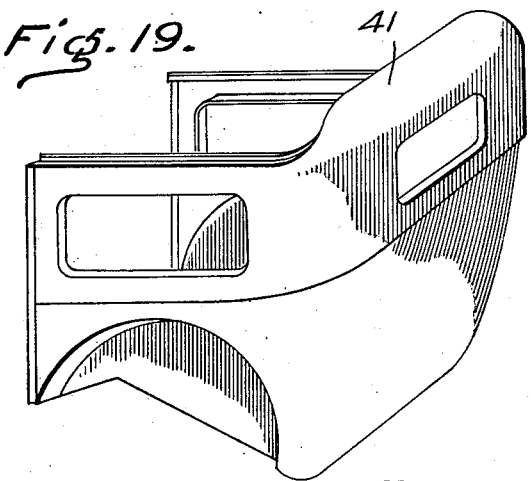
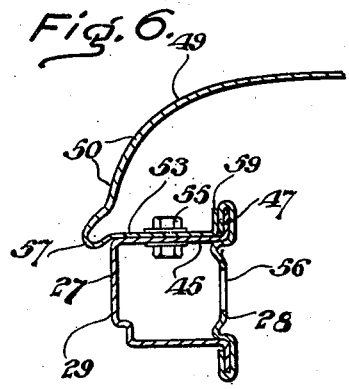
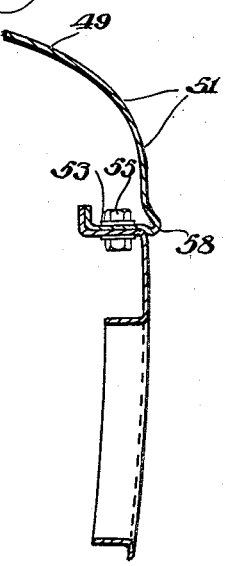
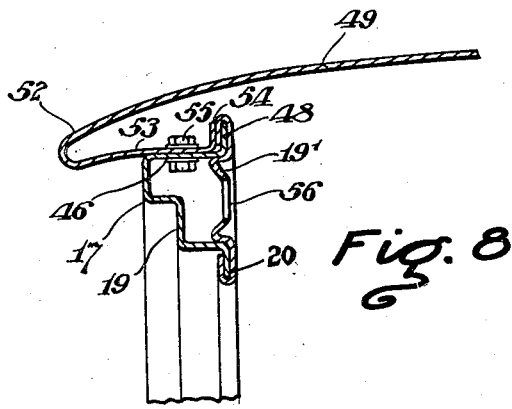
INVENTOR.
Joseph Ledwinka
BY
ATTORNEY.

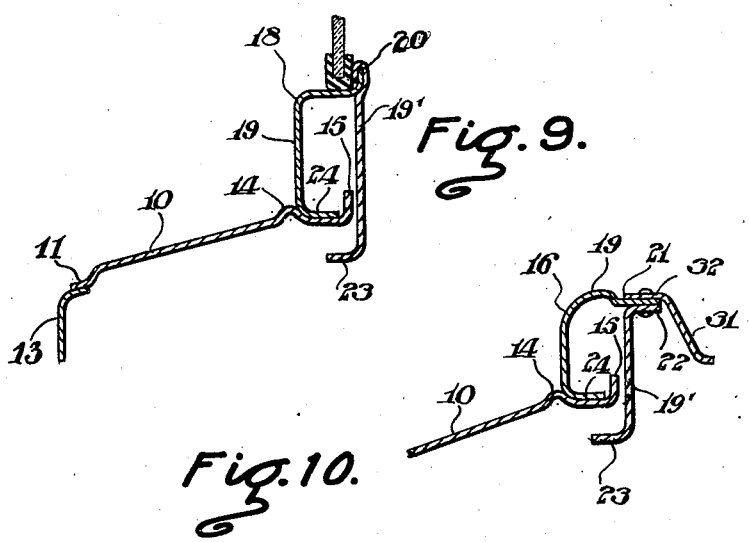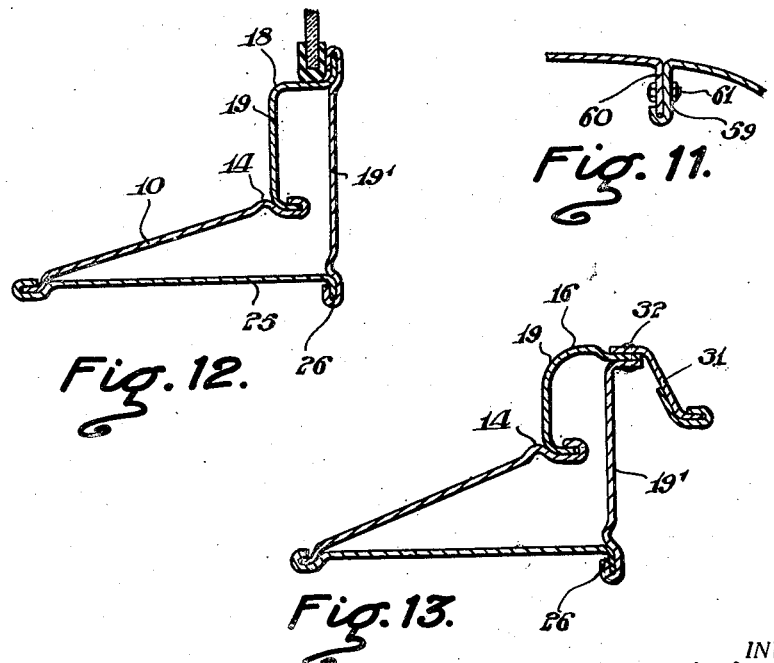

May 16, 1933. J. LEDWINKA 1,909,287
AUTOMOBILE BODY
Filed Aug. 16, 1927 5 Sheets-Sheet 5
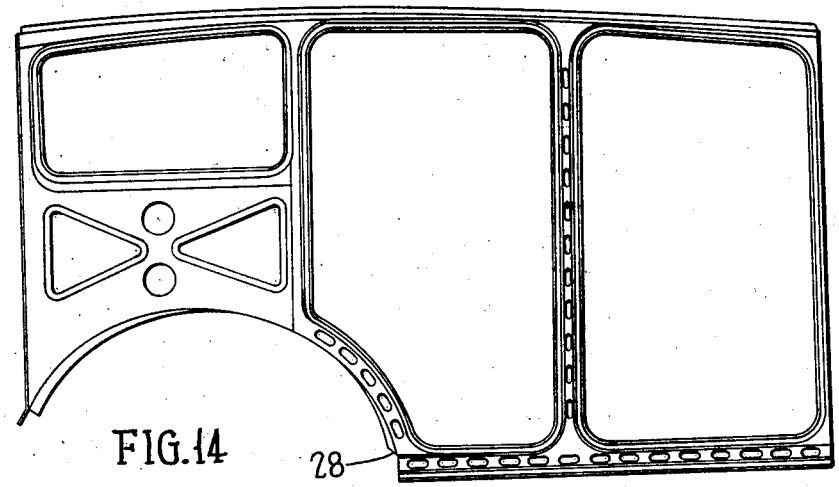
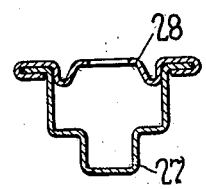
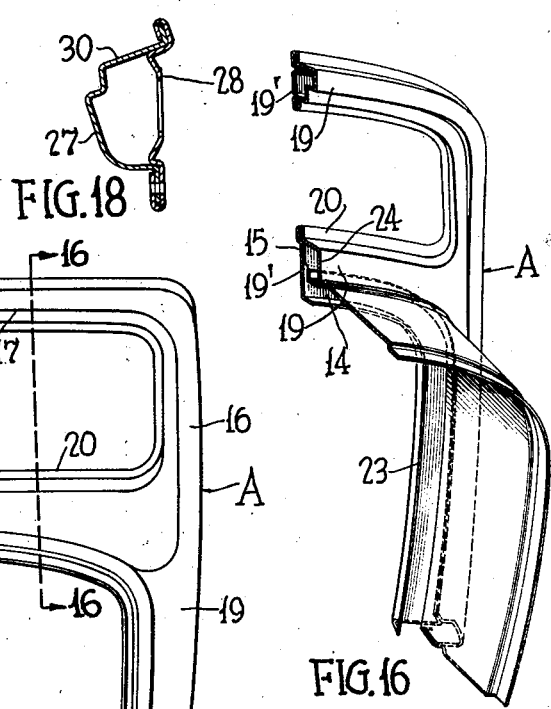
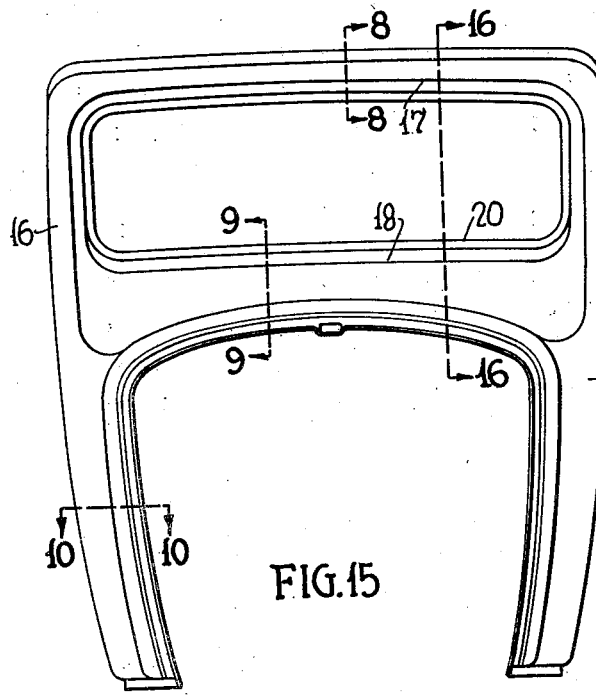
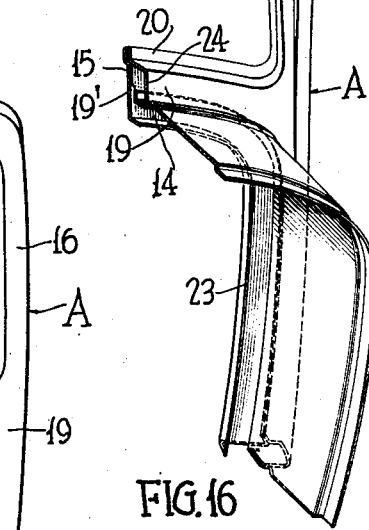
INVENTOR.
JOSEPH LEDWINKA.
BY
ATTORNEY.

Patented May 16, 1933

1,909,287

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AUTOMOBILE BODY

Application filed August 16, 1927. Serial No. 213,259.

The invention relates to closed automobile bodies constructed for the most part or substantially entirely, of sheet metal, and more particularly to bodies of this class in which the walls are constructed of unit sub-assemblies consisting, in the main, of large unitary die stampings.

Among the objects of my invention are the division of the body into sub-assembly units such that no vertical final assembly joints will appear at the back, the formation of the side and front wall sub-assemblies as substantially flat units and thus obviating the deep draws required to form them according to earlier constructions and the provision of an effective yet simple joinder of the various sub-assembly units in the final assembly.

Other and further objects and advantages will appear as the description proceeds.

I attain these objects generally by forming the rear portion of the body from rear door post to rear door post and from the bottom of the body to the roof as a unitary die stamping, by making a side wall unit extending from the front post to the rear door post and including portions of those posts structures and the header and still structures, but no portion of the roof; by making the front wall consisting of the front post and windshield frame consisting of inner and outer panels and the cowl as separate sub-assembly units, thereby permitting cowls of varying depth to be assembled with the same front wall assembly; and by forming the upper edge of the walls substantially around the entire periphery with an angular seat with which the roof unit, which may be entirely of sheet metal construction, and formed with a corresponding seat, may be readily and detachably secured in final assembly to the vertical wall units.

In the accompanying drawings:

Fig. 1 represents in side elevation a body constructed according to the invention, Fig. 2 is a similar view showing the sub-assembly units separated as they appear just prior to final assembly, Fig. 3 is a fragmentary side elevation of the rear upper portion of the body showing a modified construction, Fig. 4 is a horizontal sectional view taken in a plane below the rear quarter window openings substantially on the line 4—4 of Fig. 1, Fig. 5 is a perspective view of the rear wall unit sub-assembly, Figs. 6, 7 and 8 are sectional views taken respectively through the joints between the roof and the side, rear and the front unitary sub-assemblies respectively, Fig. 6 being a section taken substantially on the line 6—6 of Fig. 1, and Fig. 8 being a section on the line 8—8 of Fig. 15 but with the roof unit, not shown in Fig. 15, in place, Figs. 9 and 10 are sectional views taken, respectively, through the lower windshield header and cowl and through the front post and cowl substantially on the lines 9—9 and 10—10 of Fig. 15.

Fig. 11 is a section view taken through the joint between the rear sub-assembly and roof according to the modification shown in Fig. 3 substantially on the line 11—11 of that figure.

Figs. 12 and 13 are sectional views similar to Figs. 9 and 10 showing a modification.

Fig. 14 is an elevational view of the inner side of the inner panel stamping.

Fig. 15 is a front elevational view of the front unitary sub-assembly including the cowl.

Fig. 16 is a partial perspective view of the sub-assembly shown in Fig. 16, and

Figure 4:
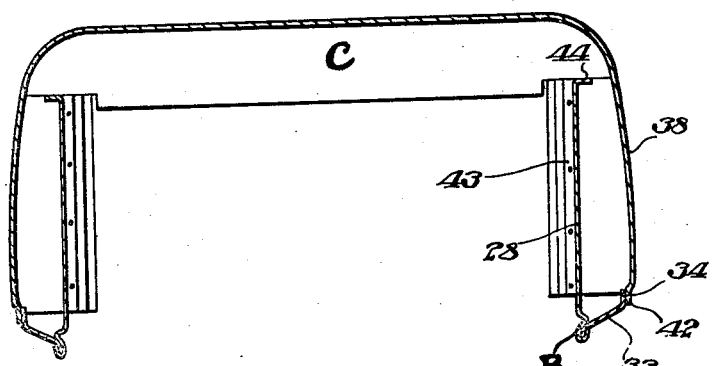

Figs. 17 and 18 are detail sectional views taken approximately on the lines 17—17 and 18—18 of Fig. 1.

Fig. 19 is a perspective view of a rear wall unit sub-assembly according to the modification shown in Fig. 3, as seen from the rear and to one side.

Referring to the drawings the body of my invention is shown in Fig. 2 divided prior to the final assembly into a front unit A, two side units B, a rear unit C and a roof unit D. To simplify the construction and produce a very light yet strong construction, each of these unitary sub-assemblies is comprised of outer unitary sheet metal stampings and in the case of some of the units with substantially coextensive and complementary inner unitary sheet metal stampings. In the case of the front unit however, I find it desirable to make the cowl and combined front post and windshield frame separate unitary stampings joined together to form the complete front unit.

In the front, unit, in order to avoid the deep draws incident to the formation of the cowl, where the same is relatively deep, according to my invention I make the sides and top of the cowl a separate unitary stamping 10 which is offset inwardly at 11 along its front edge in a usual manner to receive the rear edge of the hood, not shown. To this inwardly offset portion the usual shroud pan 13 is attached, as by welding. Adjacent its rear edge the cowl stamping 10 is formed with a bead 14 and along its rear edge it is outwardly flanged at 15, to stiffen the edge and for other purposes as will presently appear.

The front wall unitary sub-assembly, which forms with the cowl, the front unit A, and comprises front post structures 16 and upper and lower windshield headers 17 and 18 is a hollow structure throughout, being formed of unitary outer and inner stampings 19 and 19′, the outer stamping being a relatively deep draw of rearwardly presenting channel form in cross section while the inner is substantially flat. The stampings are joined around the windshield and in their upper margins by a locked crimped joint indicated at 20 in Figs. 8 and 9.

Along its outer vertical edge, the stamping 19 is offset inwardly at 21 to provide the usual rabbet to receive the door overlap. The inner stamping is provided with a rearwardly extending flange 22 secured, as by welding to the offset portion 21 of the outer stamping.

Along its inner and lower edge which is curved to conform substantially with the cowl the stamping 19′ is provided with a forwardly projecting flange 23 which not only stiffens the edge but provides a smooth interior finish. This flange 23 is spaced from the inner and lower rearwardly flanged edge 24 of the outer stamping to permit the rear edge of the cowl to be inserted in said space into overlapping relation with the flange 24 of the outer stamping, and secured thereto by welding as shown in Figs. 9 and 10, or by crimping as shown in the modification of Figs. 12 and 13. The bead 14 hides the joint and in the case of the crimped joinder it coacts with the crimped over edge to form a locked crimped joint. The flange 15 at the rear edge of the cowl, Figs. 9 and 10, also acts to shed any water should it leak through the welded joint.

According to the modification of Figs. 12 and 13, the shroud pan is dispensed with for reinforcing the cowl and an inner reinforcing stamping 25 is substituted therefor, the inner reinforcing stamping 25 being substantially co-extensive with the cowl stamping 10 and secured thereto along its front edge by crimping. Along its rear edge which is spaced from the rear edge of the outer stamping 10 it is flanged as at 26, and the inner stamping 19′ is joined thereto also by crimping. In this modified form the joinder between the reinforced cowl and the stampings 19 and 19′ forming the post and windshield structures of the front unit is entirely by crimping and the front unit formed thereby is a closed hollow structure of intercommunicating sections throughout.

It will be evident that in both forms of front unit constructions shown I obtain the substantial advantages of large unitary stampings including respectively, the cowl, and the windshield frame, of greatly reducing the number of die forming, welding, or other joining operations and at the same time I provide a construction by which various forms of cowl structures may be united with the same front wall unit, including the front post and windshield header structures. This is highly desirable, in order to meet the requirements of the trade, for frequent changes in body design, and permits the ready change of cowl design to match the lines of the hood.

The side unitary sub-assemblies B of my invention extend as shown, from the bottom of the body to and including the side header at the top but not including the side quarter of the roof, and from the front A-posts to substantially the rear door or D post, and is comprised of unitary outer and inner stampings 27 and 28 each surrounding the door openings in the side of the body and joined together around the edges of the door openings as by crimping as shown in Fig. 6. The outer stamping 27 is a deep drawing of substantially the thickness of the wall and is of substantially inwardly presenting channel form at the header 29, B—C post, and threshold 30, the sides of the channel being joined by crimping the adjacent edges of the inner panel thereon as shown in Figs. 6, 17 and 18. At the A-post, the outer stamping comprises a member 31 of substantially Z-shape in section, as is clearly shown in Fig. 13, through the outer arm 32 of which joinder is made in final assembly to the flanges 21, 22 of the front unit, as by riveting. The D-post portion 33 of the outer panel may also be of Z-section similar to the A-post portion 31, the outer arm 34 of the Z being adapted to make a final assembly joint with the rear unit C.

At the A and D posts the inner panel stamping is crimped to the inner arms of the Z-shaped portions of the outer stamping, the portion of the inner stamping forwardly of said crimped joint at the A-post lying flat against the web of the Z. A similar construction might be adapted at the D-post, but I prefer to extend the inner stamping rearwardly beyond the D-post to form a reinforce for the sides of the rear unit and to be joined thereto in final assembly in a manner to be presently described.

Figure 5:
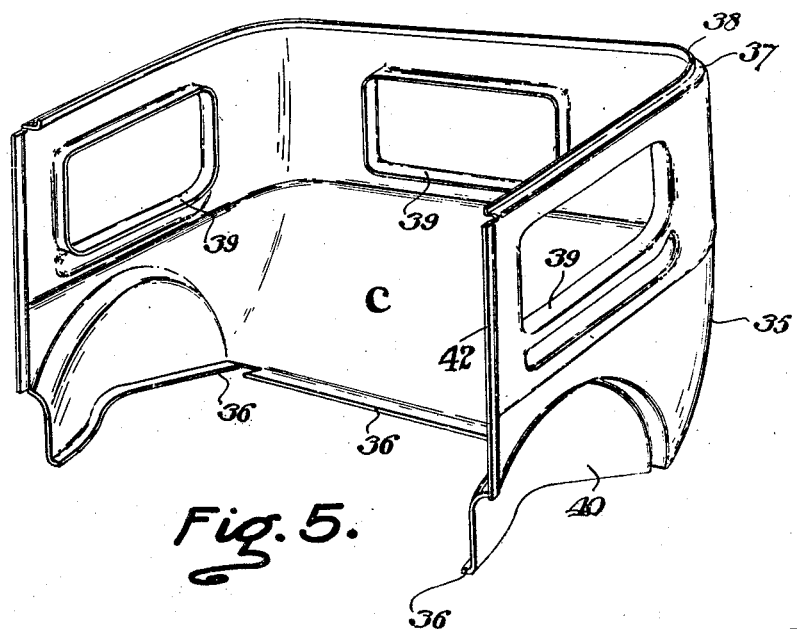

The rear unit D, shown detached in Fig. 5, comprises a unitary stamping 35 extending from D-post to D-post and forming the sides and back of the tonneau, and including the side and rear window openings. In height it extends from the bottom of the body to the roof, its top portion being on a level with the top of the side units B. It is flanged inwardly at 36 at the bottom to provide a strengthened edge and means to attach it to an underframe, not shown. It is also flanged inwardly at the top at 37 and upwardly at the inner edge of flange 37, as at 38, to afford stiffness and to provide a seat for the roof structure.

It is further flanged inwardly at 39 around the side and rear window openings. In its lower side portions the usual wheel housing depressions 40 are formed therein. In bodies in which the wheel housing depressions extend forwardly of the upper rear edge of the door opening, as in the present case, I may as herein shown, form the forward portion of the wheel housing in the side unit, and join the edges of the wheel housing portions on the side and rear units by a lap joint and by spot welding the overlapping portions together.

It will be understood, however, that I may form the entire wheel housing in the rear unitary sub-assembly, if desired.

The construction of a rear unit as just described, out of a unitary die stamping at once eliminates all vertical joints at the rear of the body. I may go further and eliminate all joints at the rear of the body, by extending the rear wall of the stamping 35' upwardly as at 41 over the rear quarter of the roof as shown in the modification of Fig. 3.

The rear sub-assembly C is offset inwardly along its forward edges to form the offset flange 42 providing a rabbet to receive the door overlap. In final assembly this flange 42 is joined as by welding to the outer arm 34 of the D-post portion of the outside stamping 27 of the side unit. The lower edge of the inner side unit stamping conforms to the curvature of the wheel housing and is flanged inwardly at 43, this flange conforming to the crown of the wheel housing and being welded thereto in the final assembly. The rear edge of the inner stamping 28 of the side unit terminates in final assembly adjacent the rear of the body and is provided with a stiffening flange 44. The inner stamping 28 may and preferably does extend upwardly and includes the rear quarter window opening, being joined to the stamping 35 of the rear unit around the window opening by crimping it to the flange 39 in a manner similar to the joinder of the inner and outer panels around the door and windshield openings. Because of this similarity, further showing is not deemed necessary.

Above the rear quarter window opening, the header construction corresponds generally to that shown in Fig. 6. In view of the similarity of these structures it has not been deemed necessary to show this section in a separate view.

By reference to Fig. 2 it will be seen that the tops of the front side and rear units A, B and C all terminate in a plane just above the door and windshield openings and are each formed with a horizontal flange designated by the reference numeral 37 in the case of the rear unit, 45 in the case of the side units, and 46 in the case of the front unit. This flange provides a continuous seat for the roof unit D and to assist in locating the roof unit and guard against the entrance of water at the joint, this flange 37, 45, 46 is provided along its inner edge with an upstanding flange designated in the respective units, 38, 47, 48. It is to the adjacent portions of this flange that the inner panel stampings 19' and 28 of the front and side units are respectively joined by crimping.

It will be evident that various forms of roof units could be seated on the continuous outwardly and upwardly presenting angular seat provided by the flanges 37, 45, 46 and 38, 47, 48 respectively, but I prefer to employ a metal roof D comprised either of a unitary stamping or of several stampings joined together along their edges. The sheet metal panel 49 is formed to include not only the relatively flat top portion of the roof but also the side quarters 50, the rear quarter 51 and the front visor 52. It is formed with a continuous inturned flange 53 along its margin, which flange may be provided as shown, with an upstanding flange 54, thus forming an angular seat complemental to the angular seat provided by the flanges 37, 45, 46 and 38, 47, 48 respectively, of the vertical wall units, with which the roof unit is adapted to nest.

The roof unit is preferably removably secured in position, and this securement may be effected as shown, by the bolts 55. Access may be had to the bolts in the hollow enclosed headers, shown in Figs. 6 and 8, through openings 56 provided for this purpose in the inner panels 19' and 28.

The side of the roof is formed with integral drip moulding 57 overhanging the joint between the roof unit and the side wall units and thus hiding the joint therebetween. Similarly an integral moulding 58 may be extended around the rear to finish the joint in that region. The projecting visor 52 at the front may dip downwardly slightly as shown to form the drip moulding and hide the joint to some extent in that region.

Where the rear unit is carried upwardly around the rear quarter of the roof as shown at 41 in the modification of Figs. 3 and 19, the rear edge of the roof is correspondingly formed to match the rear unit and the joint between the two may very well be formed by abutting flanges 59 and 60 on rear unit and roof unit respectively. In order to aid in making a water-proof joint one of the flanges, as 59 is crimped over the other to a slight extent. The joinder may be made readily detachable as in other points, by the use of bolts as 61.

While I have hereinbefore described what I now consider a preferred embodiment of my invention I am aware that various changes and modifications may be made therein without departing from the spirit and scope of the invention as expressed in the following claims.

What I claim and desire to secure by Letters Patent is:

1. A pressed metal closed body rear unit comprising a unitary sheet metal stamping extending from the rearmost door post on one side of the body to the rearmost door post on the opposite side of the body and from the bottom of the body to the roof, the rear transverse portion being arched over forwardly to form the rear roof quarter, while the longitudinally extending side portions are terminated below the roof line.

2. A pressed metal vehicle body having its vertical walls built up of unitary sub-assemblies comprising a rear unitary stamping including a wheel housing and terminating at the front substantially in the plane of the rearmost door post, and a side unitary sub-assembly comprising outer and inner unitary stampings extending around a doorway opening, the outer of said unitary side stampings terminating substantially in the plane of the rearmost door post, and making final assembly joints with the rear stamping in said plane, and the inner of said stampings being extended rearwardly over the wheel housing portion of the rear stamping and secured thereto in final assembly along the crown of the wheel housing.

3. A side unit for pressed metal vehicle bodies comprising inner and outer unitary stampings having integral margins, including within its integral margins and circumscribed by them all of the door openings in the side of the body, at least one of said stampings terminating at front and rear, respectively, at the foremost and rearmost door posts and formed with marginal flanges for joinder to an adjacent rivet.

4. A side wall unit for pressed metal vehicle bodies comprising inner and outer unitary stampings including all of the door openings in the side of the body, the outer of said stampings being flanged inwardly at top and bottom and around the door openings to a depth substantially equal to the thickness of the wall and terminating at top at the roof and below front and rear in substantially the plane of the foremost and rearmost door posts.

5. A side wall unit for pressed metal vehicle bodies comprising inner and outer unitary stampings extending around a door opening, the outer of said stampings being flanged inwardly at top below the roof and at the bottom and around the doorway opening to a depth substantially equal to the thickness of the wall and the inner stamping being substantially flat and rigidly joined to the flanges of the outer stamping at top, bottom and around the doorway openings.

6. A wall construction for vehicle bodies comprising a vertical wall portion terminating at the roof embodying an outer unitary panel stamping extending around a doorway opening and terminating at the top in a transversely inwardly extending flange ending in an upwardly extending flange, and a roof panel curved downwardly at the side to merge into the lines of the body of the outer panel stamping of the vertical wall portion and flanged transversely inwardly at the bottom of said curved portion and upwardly at the inner edge of said inwardly extending flange, the angle formed by the flanges on the roof panel nesting within the angle formed by the flanges of the vertical wall portion and means for securing the panels together through said flanges.

7. In a front construction for vehicle bodies, a post and windshield unit comprising inner and outer stampings joined together in the margins of the windshield opening and in their outer margins, and a cowl construction embodying inner and outer stampings joined to each other in their forward margins and to the inner margins, respectively, of said outer and inner stampings of the post and windshield unit.

8. In a front construction for vehicle bodies, a framework including the lower portions of the A-posts and the lower windshield header, said framework comprising inner and outer unitary stampings terminating in the front and rear margins of the post portions and joined together in the rear margins of the post portions and in the upper margin of the windshield header portion, and a hollow cowl comprising unitary stampings joined together in their front margins and respectively, to the margins of the inner and outer stampings of the A-post and windshield header unit.

9. A side wall unit for pressed metal vehicle bodies comprising an outer unitary stamping extending around a doorway opening, the said outer stamping being flanged inwardly at the top below the roof and at the bottom and around the doorway opening to a depth substantially equal to the thickness of the wall, and an inner sheet metal reinforcing paneling of substantially flat form rigidly joined to the flanges of the outer stamping at the top, bottom and around the doorway opening.

In testimony whereof I hereunto affix my signature.

JOSEPH LEDWINKA.